United States Patent [19]
Canada et al.

[11] Patent Number: 6,087,796
[45] Date of Patent: Jul. 11, 2000

[54] METHOD AND APPARATUS FOR DETERMINING ELECTRIC MOTOR SPEED USING VIBRATION AND FLUX

[75] Inventors: Ronald G. Canada, Knoxville; Eugene F. Pardue, Lenoir City, both of Tenn.; David M. Smith, Ruckersville, Va.; Paul Z. D. Wolfensberger, Knoxville, Tenn.

[73] Assignee: CSI Technology, Inc., Wilmington, Del.

[21] Appl. No.: 09/098,182

[22] Filed: Jun. 16, 1998

[51] Int. Cl.⁷ .............................. G01R 31/02; G05B 23/02
[52] U.S. Cl. ...................... 318/565; 318/490; 318/647; 73/514.39; 73/510; 324/260; 702/145
[58] Field of Search ..................... 73/514.16, 514.39, 73/519.01, 520.01, 510; 318/490, 565, 430, 647, 432; 361/23; 324/219, 260, 529; 364/550–552, 576; 702/64, 65, 75–77, 142, 145, 147

[56] References Cited

U.S. PATENT DOCUMENTS

| | | | |
|---|---|---|---|
| 4,185,279 | 1/1980 | Bachman | 340/671 |
| 4,358,734 | 11/1982 | Elfner et al. | 324/161 |
| 4,495,448 | 1/1985 | Dumbeck | 318/54 |
| 4,527,101 | 7/1985 | Zavis et al. | 318/245 |
| 4,732,034 | 3/1988 | Bjorn | 73/1.41 |
| 4,913,625 | 4/1990 | Gerlowski | 417/18 |
| 5,049,795 | 9/1991 | Moulds, III | 318/561 |
| 5,369,348 | 11/1994 | Gennesseaux | 318/623 |
| 5,530,325 | 6/1996 | Friedrich et al. | 318/245 |
| 5,530,343 | 6/1996 | Bowers, III et al. | 324/173 |
| 5,581,178 | 12/1996 | Richter et al. | 324/177 |
| 5,680,025 | 10/1997 | Bowers, III et al. | 318/806 |
| 5,726,911 | 3/1998 | Canada et al. | 702/32 |
| 5,744,723 | 4/1998 | Piety | 73/660 |
| 5,757,676 | 5/1998 | Hobelsberger | 702/145 |
| 5,841,255 | 11/1998 | Canada et al. | 318/490 |
| 5,852,351 | 12/1998 | Canada et al. | 318/490 |

Primary Examiner—Brian Sircus
Attorney, Agent, or Firm—Luedeka, Neely & Graham, PC

[57] ABSTRACT

A programmable apparatus is used to determine the running speed of an ac induction motor based on vibration and flux measurements. A first analysis is performed on at least one of the vibration and flux signals according to a first criterion to determine candidate speeds and whether speed will be determined based on the first analysis or whether a second analysis is required. A second analysis is selectively performed if required by the first analysis. In the first analysis, vibration signals (for example) are transformed to the frequency domain, such as by Fast Fourier Transform, and vibration amplitude peaks contained in the resulting spectrum are analyzed to identify candidate peaks. If only one candidate peak is identified, the frequency at which the candidate peak occurs is used to determine motor running speed. If two or more candidate peaks are identified and the motor is a two-pole motor, the candidate peak having the maximum amplitude is used to determine running speed. If two or more candidate peaks are identified and the motor has more than two poles, a second analysis is performed by producing a flux spectrum. Peaks at various frequencies within the flux spectrum are compared to the candidate peaks and each candidate peak is scored based on the comparison. The scores are compared to a predetermined score threshold to determine which candidate peak will be used to determine motor running speed. Preferably, each candidate peak is also subjected to testing to determine whether the candidate peak accurately represents the frequency at which the true peak occurs.

27 Claims, 6 Drawing Sheets

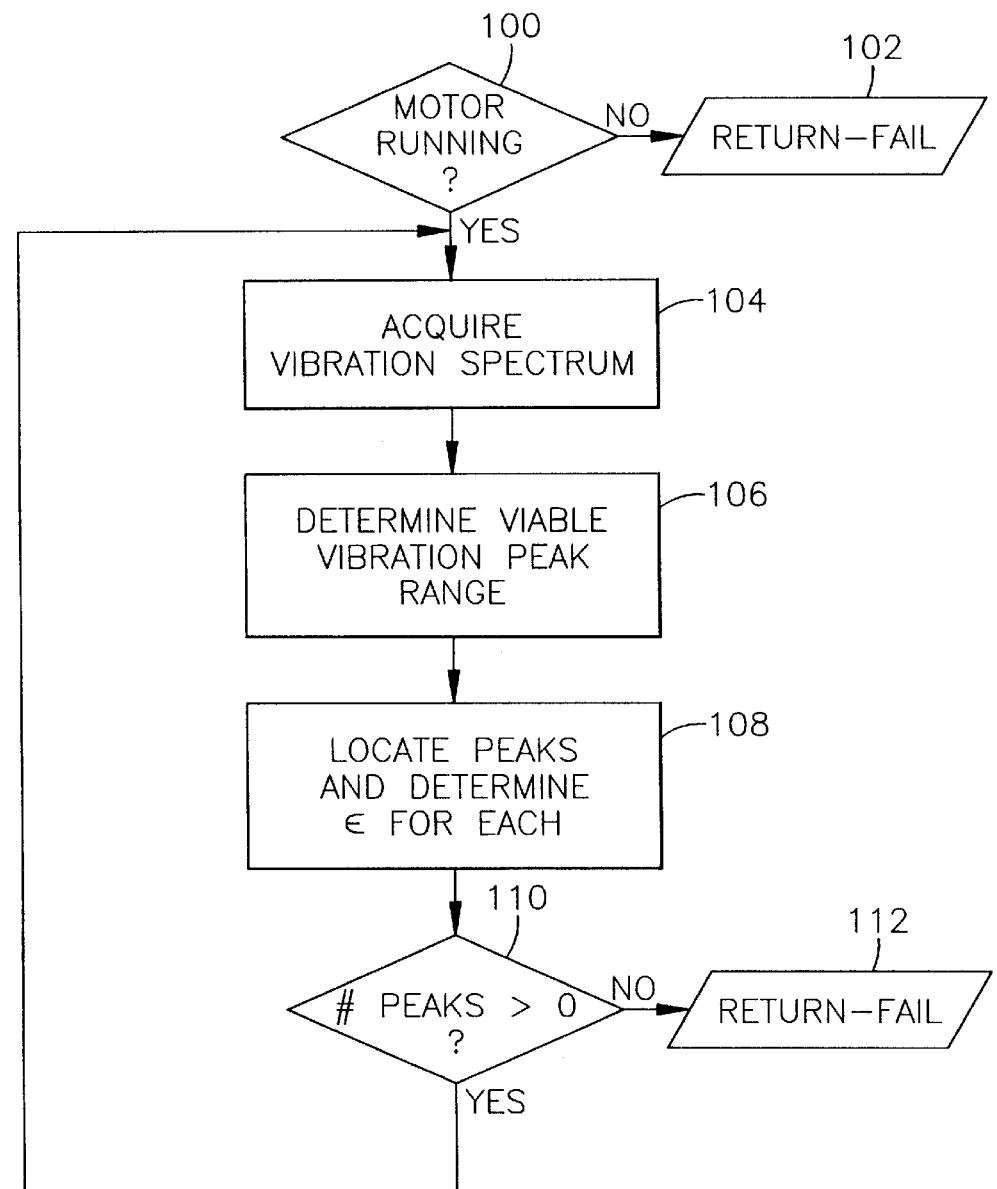

METHOD AND APPARATUS FOR DETERMINING ELECTRIC MOTOR SPEED USING VIBRATION AND FLUX

TECHNICAL FIELD

The present invention relates generally to speed determination for electric motors. More particularly, it relates to the use of vibration and flux to determine the speed of an ac induction electric motor.

BACKGROUND

Predictive maintenance of ac induction motors typically involves many complex and interrelated calculations of various motor parameters based on readings acquired from sensors attached to the motor. For some calculations, the accuracy of the motor parameter calculation is dependent upon an accurate determination of motor speed. For example, it is known that the speed of an ac induction motor will vary in relation to loading of the motor. Accordingly, a typical calculation of motor load involves determining motor speed and then calculating load from speed. As the accuracy of the speed determination decreases, so too does the accuracy of the load calculation.

As another example, trend parameters acquired from flux spectra commonly are associated with spectral peaks (such as running speed sidebands) that lie a significant distance away from the primary running speed peak. An error introduced in the determination of running speed is amplified as the analysis moves out in the frequency spectrum away from the primary running speed peak. The result of this amplification of the running speed error is that it often becomes very difficult to locate a particular peak of interest even when the running speed error is small. Unfortunately, current methods for determining the speed of ac induction motors do not provide the level of accuracy often needed by the analyst to eliminate these problems.

Therefore, there is a need for a highly accurate and reliable method and apparatus for determining the speed of an electric motor.

SUMMARY

With regard to the foregoing and other objects, the invention provides a programmable apparatus and method for determining the running speed of an ac induction motor. The apparatus includes a vibration transducer for sensing vibration generated by the motor and for producing vibration signals corresponding to the sensed vibration. A flux sensor is used to sense flux generated by the motor and to produce corresponding flux signals. The vibration and flux signals are processed by signal conditioning circuitry to produce processed vibration and flux signals. A microcontroller determines the running speed of the motor based on the processed vibration and flux signals.

The microcontroller is programmed to analyze the vibration and flux signals to determine the running speed of the motor. The microcontroller accomplishes this task by performing a first analysis on at least one of the processed vibration and flux signals according to a first predetermined criterion to determine one or more candidate speeds and whether speed will be determined based on the first analysis or whether a second analysis is required. The microcontroller selectively performs a second analysis if required by the first analysis. The second analysis includes the steps of comparing the processed vibration signals to the processed flux signals and determines running speed based on the comparison.

In one embodiment, the first analysis is performed by operating on the processed vibration signals to produce a vibration spectrum having a plurality of vibration amplitude peaks at a plurality of vibration frequencies with the vibration spectrum having a resolution. The vibration amplitude peaks are analyzed to identify one or more candidate vibration amplitude peaks according to a predetermined peak criterion—the candidate peaks being identified as peaks which possibly correspond to the running speed of the motor. Preferably, the candidate peaks are all included within a range of frequencies considered most likely to contain the primary running speed peak for the motor. A candidate peak is then selected from the one or more candidate peaks to use in determining the running speed of the motor.

The microcontroller selects a candidate peak by determining the number of candidate peaks identified. If only one candidate peak is identified, then the frequency of the candidate peak is used to determine the running speed of the motor. If more than one candidate peak is identified, the microcontroller performs the second analysis.

The second analysis is performed by operating on the processed flux signals to produce a flux spectrum including a plurality of flux amplitude peaks at a plurality of flux frequencies corresponding to the running speed of the motor. The candidate vibration peaks are compared to one or more flux peak frequencies and a comparison output is produced. The running speed of the motor is then determined based on the comparison output. In a preferred embodiment, the microcontroller produces the comparison output by scoring each candidate vibration peak based on the frequencies at which one or more flux amplitude peaks occur in the flux spectrum.

The first analysis is performed by calculating a value ($\epsilon$) for each candidate peak where $\epsilon$ corresponds to the frequency at which a true peak occurs. For each candidate peak, the value $\epsilon$ is compared to a predetermined $\epsilon$ criterion. If only one candidate peak is identified and meets the predetermined $\epsilon$ criterion, the frequency of that candidate peak is used to determine the running speed of the motor. If more than one candidate peak is identified and each meets the predetermined $\epsilon$ criterion, the second analysis is performed.

If one or more candidate peaks do not meet the predetermined $\epsilon$ criterion, the microcontroller determines whether resolution of the vibration spectrum is at a maximum. If the motor is a two-pole motor, the frequency of the candidate peak having the maximum vibration amplitude is used to determine the running speed of the motor. If resolution is maximized and/or the motor has more than two poles, the second analysis is performed.

In a further embodiment, the first analysis is performed by transforming processed vibration signals to the frequency domain to produce a vibration spectrum containing a first quantity of spectral lines (defining spectral resolution) with corresponding amplitude peaks including a primary running speed peak corresponding to the running speed of the motor. The microcontroller then determines a range of frequencies within the vibration spectrum which contains vibration peaks. Candidate peaks within the range of frequencies are identified as peaks possibly corresponding to the primary running speed of the motor according to a predetermined peak criterion. A value $\epsilon$ is calculated as described above and if the number of candidate peaks is equal to one, the value $\epsilon$ for the candidate peak is compared to a predetermined $\epsilon$ criterion. If the candidate peak meets the predetermined $\epsilon$ criterion, the candidate peak is selected as the primary running speed peak. If the candidate peak does not meet the predetermined ε criterion, the microcontroller determines whether resolution of the vibration spectrum is at a maximum. If resolution is at a maximum, the candidate peak is selected as the primary running speed peak. If resolution is not at a maximum, resolution is increased by producing a vibration spectrum containing a second quantity of spectral lines greater than the first quantity of spectral lines and the new spectrum is processed as described above to determine running speed. If the number of candidate peaks identified within the range of frequencies is greater than one, the value ε is compared for each candidate peak to a predetermined ε criterion and if all candidate peaks meet the predetermined criterion, the second analysis is performed by transforming the flux signals to the frequency domain to produce a flux spectrum. If less than all of the candidate peaks meet the predetermined ε criterion, the microcontroller determines whether resolution of the vibration spectrum is at a maximum. If resolution is not maximized, resolution is increased as described above. In the second analysis, a score is assigned to each candidate peak in the vibration spectrum based on the location of peaks in the flux spectrum. If any score is greater than a predetermined score threshold, the candidate vibration peak having the maximum score is selected as the primary running speed peak. If all scores are less than the predetermined score threshold, the candidate vibration peak having the maximum amplitude is selected as the primary running speed peak.

In another embodiment of the invention, the running speed of an ac induction motor is determined by a programmable apparatus that includes a structural enclosure where the structural enclosure is attached to the motor. A power source is disposed in the enclosure for supplying dc electrical power to the programmable apparatus. A vibration transducer disposed in the enclosure senses vibration generated by the motor and produces vibration signals corresponding to the sensed vibration. A flux sensor is also disposed in the enclosure to sense flux generated by the motor and to produce corresponding flux signals. A signal processor disposed in the enclosure receives and processes the vibration and flux signals, as described above, to determine the running speed of the motor.

BRIEF DESCRIPTION OF THE DRAWINGS

The above and other features, aspects and advantages of the present invention will now be discussed in the following detailed description and appended claims considered in conjunction with the accompanying drawings in which:

FIGS. 3A–C collectively are a flow diagram of method steps performed by the computer of FIG. 1 to determine the speed of an ac induction motor in accordance with the invention;

DETAILED DESCRIPTION OF A PREFERRED EMBODIMENT

Figure 1:
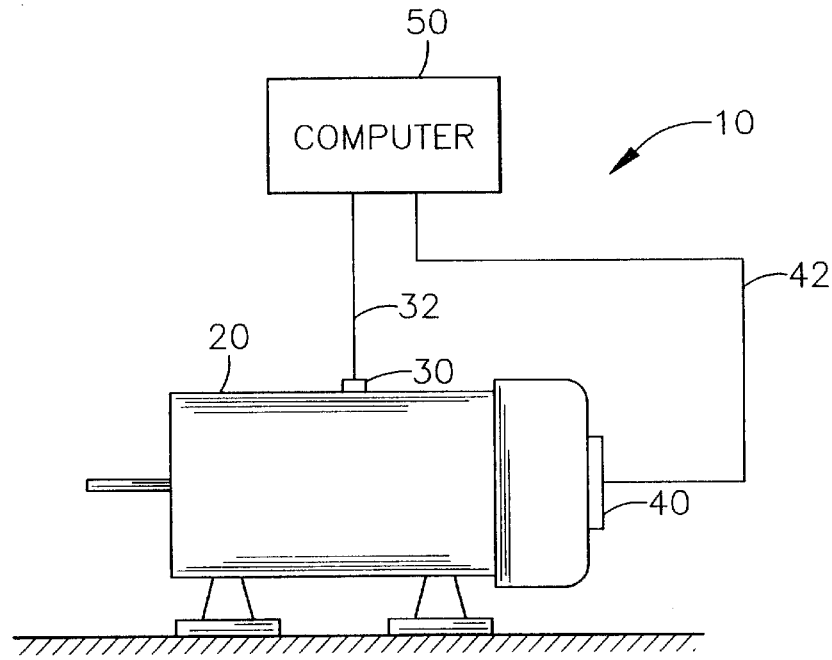
FIG. 1 is a diagrammatic drawing of an ac induction motor and a computer which receives signals from vibration and flux sensors attached to the motor to determine motor speed.

With reference now to the drawings in which like reference characters designate like or similar parts throughout the several views, FIG. 1 illustrates an apparatus 10 for determining the speed of an ac induction motor 20. In general, this is achieved by placing a vibration transducer 30 in sensory contact with the motor 20 so that the vibration transducer 30 senses vibration generated by the motor 20 and outputs vibration signals on line 32 corresponding to the sensed vibration. In similar fashion, a flux sensor 40 is placed in sensory contact with the motor 20 to produce flux signals on line 42. A computer 50 receives the vibration and flux signals and processes the signals to determine motor speed.

Figure 2:
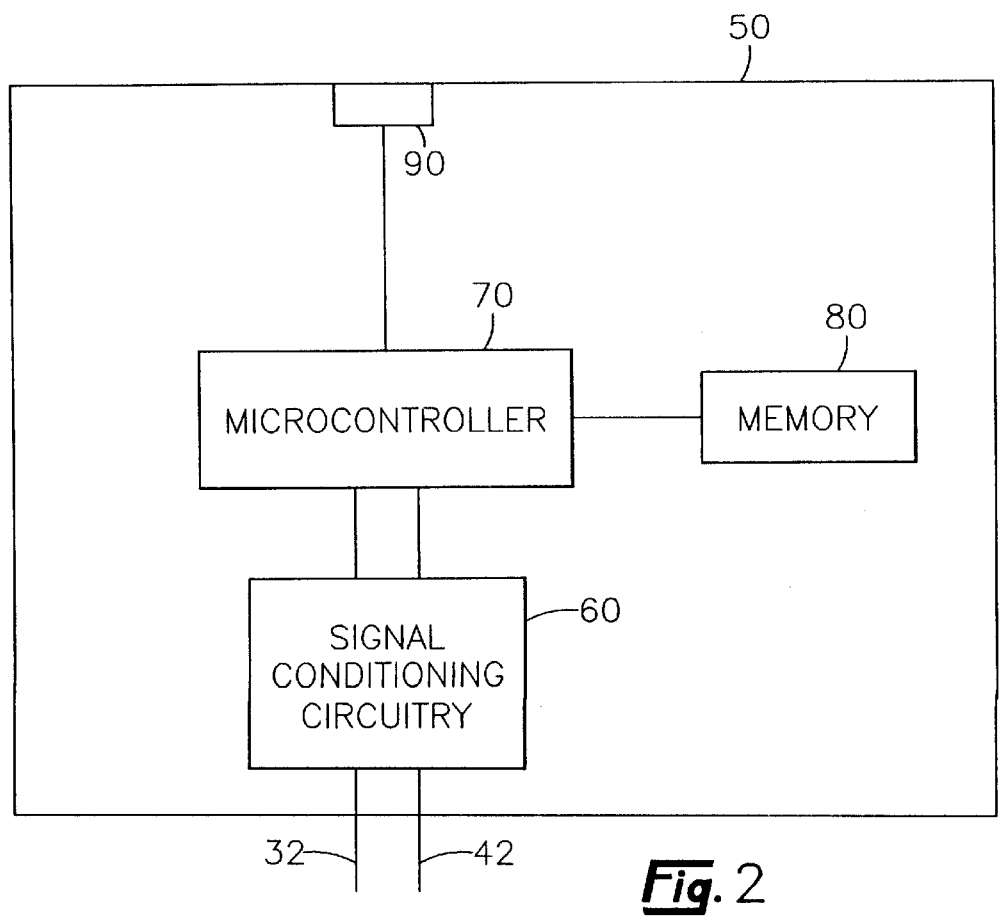
FIG. 2 is a functional block diagram of the computer illustrated in FIG. 1.

The computer 50 may be any programmed or programmable apparatus configured to receive and process sensor signals in accordance with the invention. FIG. 2 shows a functional block diagram of basic elements of the computer 50. These elements include signal conditioning circuitry 60 which includes filters, amplifiers, and A/D converters for filtering, amplifying, and digitizing sensor signals received on lines 32 and 42. The processed sensor signals are then provided to a signal processor, or microcontroller 70 which determines motor speed based on the processed sensor signals. In a preferred embodiment, microcontroller 70 is a 16-bit microcontroller manufactured and marketed by Toshiba under model no. TLCS-900. Preferably, a memory 80 is provided to meet information storage needs and a communications port 90, such as an infrared data link, is employed to enable the computer 50 to communicate with a peripheral device.

Figure 4:
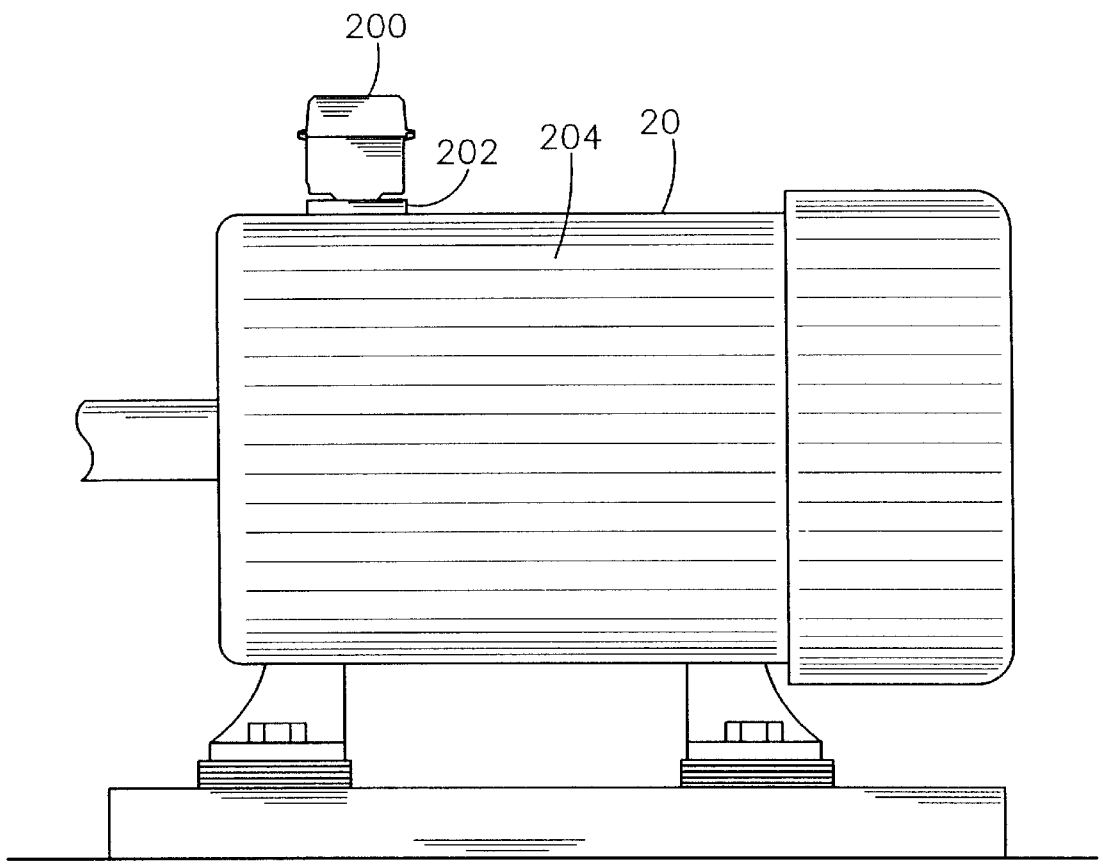
FIG. 4 is a side view of a motor monitor with internal vibration and flux sensors and being attached to an ac induction motor to determine motor speed.
Figure 5:
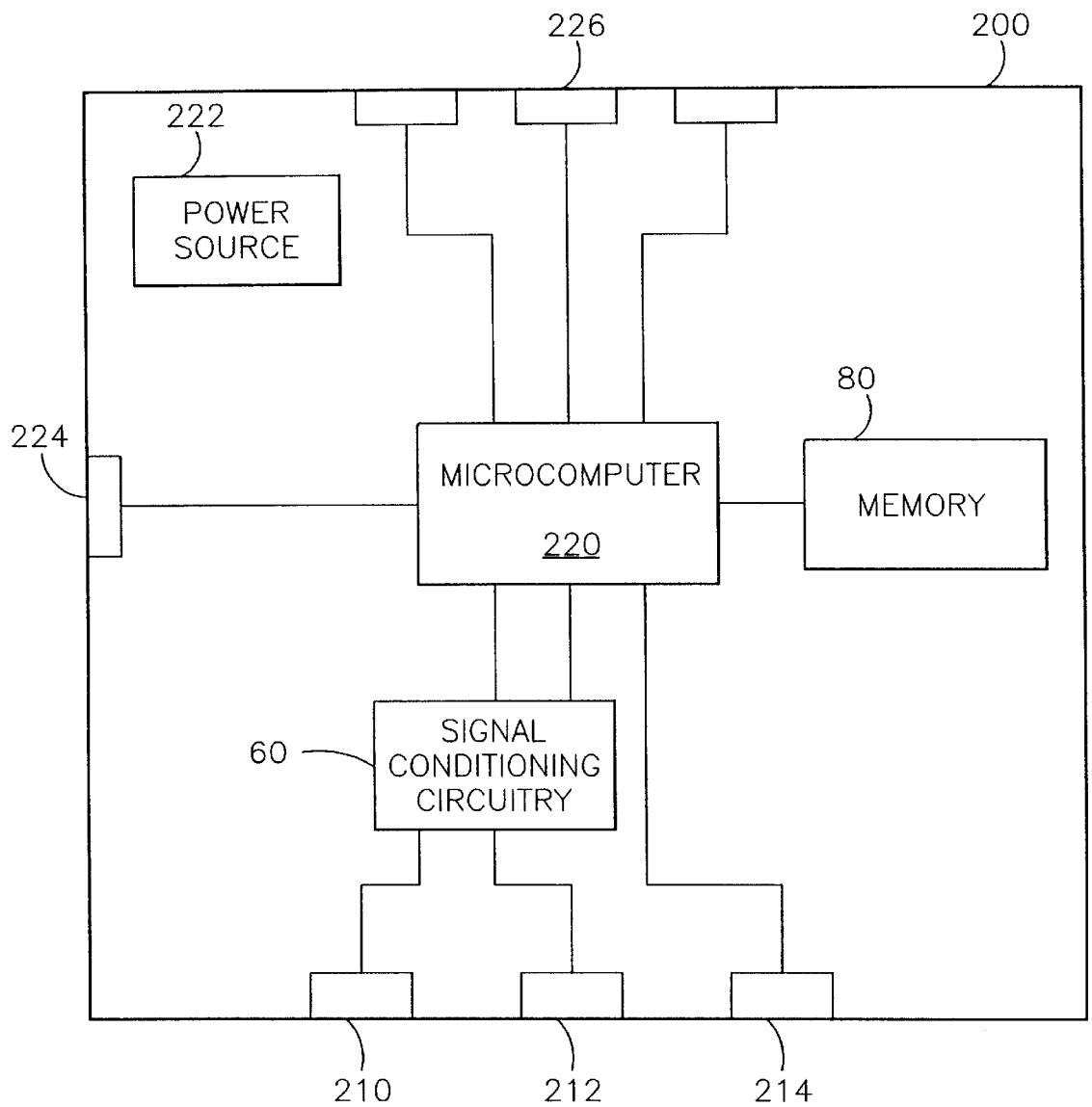
FIG. 5 is a functional block diagram of the motor monitor shown in FIG. 4.

Although FIGS. 1 and 2 show the vibration transducer 30 and flux sensor 40 external to the computer 50, a preferred embodiment of the invention shown in FIGS. 4 and 5 provides a computer or motor monitor 200 having an enclosure which includes both a vibration transducer 210 and a flux sensor 212. Such an apparatus is described in U.S. Pat. No. 5,726,911 which issued on Mar. 10, 1998, the entire contents of which are expressly incorporated herein by reference.

Figure 3B:
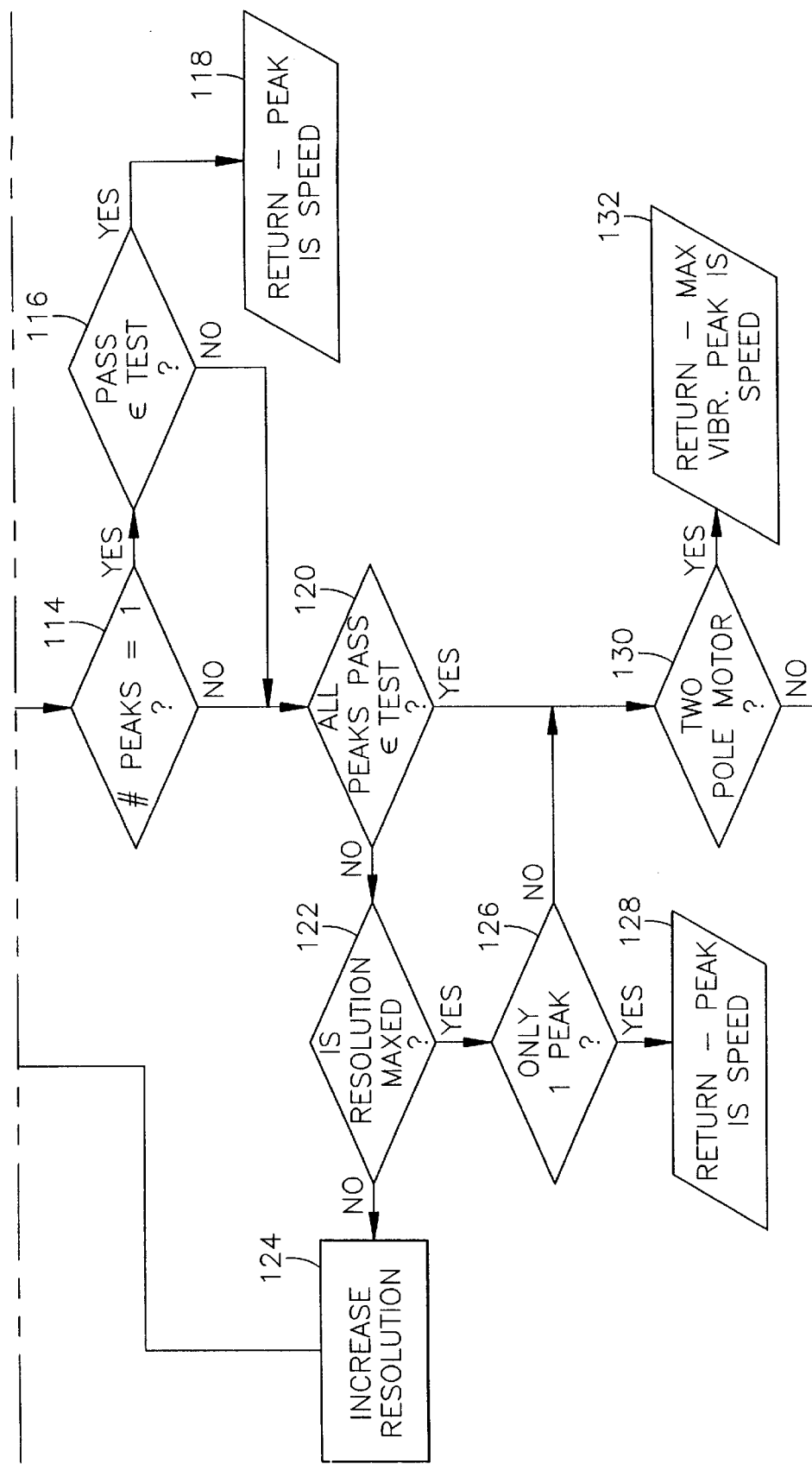
Figure 3C:
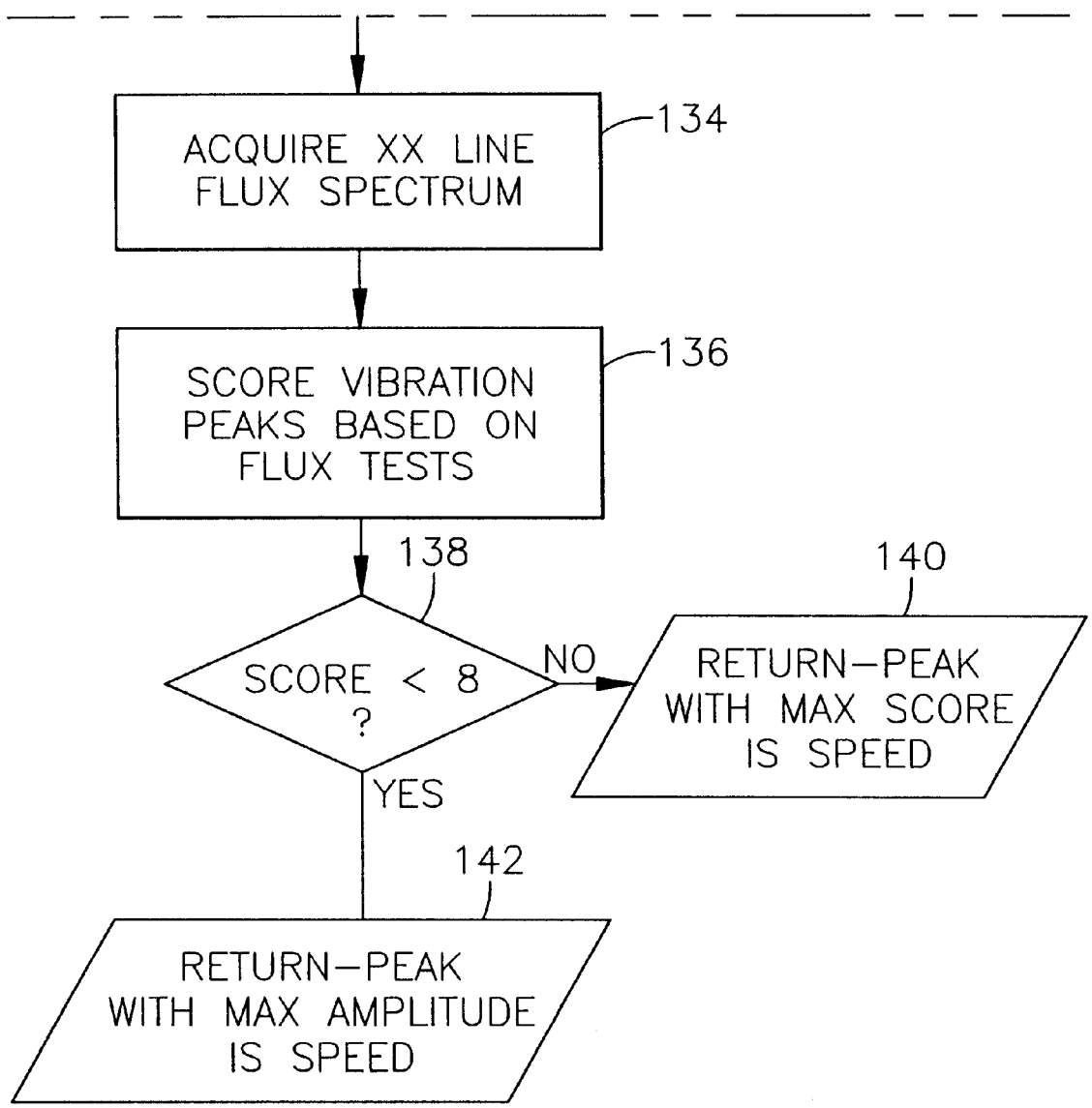

The flowchart of FIGS. 3A—C illustrate the steps performed by the microcontroller 70 when programmed to determine motor speed in accordance with the invention. Initially, the microcontroller 70 determines whether the motor 20 is running (100). An error code of −1.0 is added to a counter (102) if the motor 20 is not running. If the motor 20 is running, a vibration spectrum is acquired (104). Although any windowing function may be employed, a preferred embodiment of the invention employs a Hanning window during computation of the vibration spectrum. Preferably, the vibration spectrum is acquired by performing a Fast Fourier Transform (FFT) of processed vibration signals and the frequency range of the spectrum is preferably 0 Hz to 120 Hz for a motor having a synchronous speed of 60 Hz or less than 60 Hz. In the interest of increasing processing speed, the resolution (i.e., number of lines or data points in the spectrum) of the vibration spectrum is preferably initially set to 400 lines. If a higher resolution is needed to complete the speed determination process, as discussed below, the resolution may be increased, preferably by a factor of "2". In other words, spectral resolution may be increased to 800 lines, 1600 lines, 3200 lines, and so forth.

In the vibration spectrum, a vibration energy peak will always occur at the actual turning speed or running speed of the motor 20. This peak, which will be hereinafter referred to as the primary running speed peak, is not necessarily the largest peak in the spectrum. To determine the running speed of the motor 20, the present invention contemplates searching the vibration spectrum to locate the primary running speed peak by considering both the position and amplitude of vibration energy peaks occurring in a selected portion of the vibration spectrum. When the primary running speed peak is located, the microcontroller 70 uses the frequency at which the primary running speed peak occurs to determine the running speed of the motor 20. In a preferred embodiment, the frequency at which the primary running speed peak occurs in the vibration spectrum will be in units of Hertz. Running speed is calculated in units of rpm by multiplying the frequency at which the primary running speed peak occurs by sixty (60).

To minimize the extent of searching, a viable range of the vibration spectrum considered most likely to contain the primary running speed peak is determined (106). The viable vibration peak range is determined by first computing rated motor slip in units of Hertz. Rated slip is computed as the difference between the synchronous speed of the motor 20 and the rated running speed. Synchronous speed is determined from the number of poles and the line frequency of the motor by the following relation.

$$\text{Speed}_{Hz} = \frac{2 \times (\text{Line Freq})}{(\text{Number of Poles})} \quad (1)$$

Rated running speed is typically printed on the nameplate attached to the motor 20. These measures are converted to Hertz, if necessary, and subtracted to yield slip in Hertz. For example, for a two-pole motor having a synchronous speed of 3600 rpm (60 Hz) and a rated running speed of 3,580 rpm (59.66 Hz), rated slip is equal to 0.33 Hz.

Rated slip is then multiplied by an enlargement factor, which is preferably "1.5", to yield an enlarged slip value. In the example given above, the enlarged slip value is 0.33 Hz×1.5, or 0.5 Hz. The enlarged slip value is then subtracted from the synchronous speed of the motor 20 to yield a lower limit for the viable vibration peak range. Continuing the above example, the lower limit for the viable vibration frequency range is 59.5 Hz. The upper limit of the viable vibration frequency range is the synchronous speed of the motor 20, or in the above example, 60 Hz. Enlarging slip by 150% increases the viable vibration peak range to add an extra measure of confidence that the primary running speed peak is contained within the viable vibration peak range.

It will be further appreciated that instead of computing an FFT over a relatively broad frequency range as compared to the viable vibration peak range, a Discrete Fourier Transform (DFT) may be computed only for the viable vibration peak range in accordance with the invention. However, an FFT is generally more computationally efficient than a DFT and is, therefore, preferred.

Next, vibration energy peaks contained in the viable vibration peak range are identified as candidate peaks which may or may not be the primary running speed peak. The microcontroller 70 is programmed with predetermined criteria for identifying a line in the vibration spectrum as being a candidate peak. First, to qualify as a candidate peak, the amplitude of a line in the spectrum must be greater than a predetermined threshold, preferably a value slightly higher than the noise floor. Next, the lines of the spectrum on either side of the subject line are examined. Those two lines must be smaller than the subject line before the subject line is qualified as a candidate peak. Alternatively, a single criterion, such as the amplitude must be greater than a predetermined peak threshold, is used by the microcontroller 70 to identify candidate peaks.

Frequently, a candidate peak is represented by a line which does not fall on the apex of a peak, but rather, somewhere below the apex. In this situation, the frequency of the candidate peak does not represent the frequency of the true peak. When this phenomenon occurs, it can adversely affect the accuracy of the speed determination process. Therefore, although not required in order to practice the invention, in a preferred embodiment each candidate peak is evaluated to assess the likelihood that the frequency at which the candidate peak occurs is the frequency at which the actual peak occurs. This is accomplished by determining a value $\epsilon$ where $\epsilon$ is a measure that corresponds to the frequency at which the true peak occurs.

To calculate $\epsilon$ for candidate peaks which are identified in a spectrum derived by use of a Hanning window, an estimate of the true peak frequency ($\omega$) is calculated once by looking for a true peak to the left of the candidate peak, and a second calculation of $\omega$ is made by looking for a true peak to the right of the candidate peak. If the candidate peak is a true peak, then the calculation of $\omega$ to the left of the candidate peak ($\omega_L$) will be equal or very close to equal with the calculation of $\omega$ to the right of the candidate peak ($\omega_R$), as given by the following equation:

$$\omega = \omega_R = \omega_L \quad (2)$$

Equation (1) can be rewritten as follows:

$$\omega = \frac{2A_{\delta+1} - A_\delta}{A_{\delta+1} + A_\delta} = \frac{A_\delta - 2A_{\delta-1}}{A_{\delta-1} + A_\delta} \quad (3)$$

where:
$A_\delta$ represents the amplitude of the candidate peak;
$A_{\delta+1}$ represents the amplitude of a potential peak adjacent and to the right of the candidate peak; and
$A_{\delta-1}$ represents the amplitude of a potential peak adjacent and to the left of the candidate peak.

The two peak location values $\omega_R$, $\omega_L$ obtained from Equation (3) are subtracted from one another to yield a difference ($\Delta$) as given by the following equation:

$$\Delta = \omega_R - \omega_L \quad (4)$$

The value $\epsilon$ is calculated as the absolute value of $\Delta$ divided by the product of two times the frequency resolution times rated slip, as given by Equation (5) below:

$$\varepsilon = \frac{|\Delta|}{2 \times (\text{Frequency Resolution}) \times (\text{Rated Slip})} \quad (5)$$

where:
Frequency Resolution=# lines/frequency range of interest.

The value $\epsilon$ is determined in accordance with Equation (4) for each candidate peak and stored in memory 80. The microcontroller 70 next determines whether the number of candidate peaks is greater than "0" (110). If there are no candidate peaks, the method fails to compute a running speed estimate and returns (112). If there is at least one candidate peak, the microcontroller 70 determines whether there is only one candidate peak (114). If there is only one candidate peak, the value $\epsilon$ for that peak is tested by comparing $\epsilon$ to a predetermined threshold, or criterion (116). In a preferred embodiment, the criterion is 0.04. If $\epsilon$ is less than or equal to the predetermined criterion, then the candidate peak is identified as the primary running speed peak (118). If $\epsilon$ is greater than the predetermined criterion, the method proceeds to block 122 to determine whether spectral resolution is at a maximum, as further discussed below.

Referring again to block 114 of FIG. 3B, if the number of candidate peaks are greater than "1", then all candidate peaks are tested to determine whether ε for each peak meets the predetermined criterion (120) as discussed above. If not all peaks pass the ε test, the microcontroller 70 determines whether the resolution of the vibration spectrum is at a maximum (122). In a preferred embodiment, the maximum resolution of the vibration spectrum is 3200 lines. If resolution is not at its maximum, the microcontroller 70 increases resolution to the next highest value (124) and acquires another vibration spectrum (104).

It will be appreciated that the initial vibration spectrum may be acquired at step 104 with the maximum resolution available, thus avoiding the need to adjust spectral resolution. However, for purposes of improving computational efficiency, it is preferable to initially acquire the vibration spectrum at a lower resolution and increase resolution only when needed. In acquiring subsequent vibration spectra, it is preferable to acquire the subsequent spectra from newly acquired vibration transducer readings. Otherwise, the vibration transducer readings used to acquire the initial vibration spectrum will need to be stored in memory 80, thereby reducing computational efficiency in the acquisition of the initial vibration spectrum.

If resolution is at a maximum (122), the microcontroller 70 determines whether there is only one candidate peak (126). If so, that candidate peak is identified as the primary running speed peak (128). If there is more than one candidate peak and resolution is maxed, or if all candidate peaks pass the ε test (120), the microcontroller 70 determines whether the motor 20 is a two-pole motor (130). If it is, then the candidate peak having the maximum amplitude is identified as the primary running speed peak (132).

If the motor 20 has more than two poles, the microcontroller 70 acquires a flux spectrum (134), which is preferably a 3200 line spectrum, to determine which candidate vibration peak is the primary running speed peak. In the flux spectrum, one would expect to see several peaks corresponding to the running speed of the motor 20, including a peak at the actual running speed and at line frequency±running speed. The flux spectrum should also contain slot pass frequency peaks corresponding to the slip of the motor 20 multiplied by the number of poles in the motor 20±line frequency. Additional peaks are observable at (line frequency±running speed)±(number of poles×slip)/2. Each of the candidate vibration peaks are evaluated or scored based on the location of peaks within the flux spectrum which correspond to running speed (136). The likelihood that a candidate peak in the vibration spectrum is the primary running speed peak is then determined based on the scoring of the candidate peak.

To score a candidate peak, the candidate peak is assumed (for purposes of scoring) to be the primary running speed peak for the motor 20. The assumed running speed is then used to calculate one or more frequency values (such as those calculated in accordance with Equations 5–11 below) at which peaks corresponding to running speed are expected to occur in the flux spectrum. Predetermined criteria are established to score each peak based on whether or not a peak is present in the flux spectrum at the calculated frequency value.

For example, the predetermined criteria for scoring candidate vibration spectrum peaks based on flux spectrum peaks may be simply to determine that if a candidate peak has a corresponding flux spectrum peak which occurs at the same frequency as the candidate peak, then the candidate peak is the primary running speed peak. In a preferred embodiment, however, several calculations of frequency values (at which peaks corresponding to running speed are expected to occur in the flux spectrum) are made for each candidate peak and the flux spectrum is examined to determine whether or not a peak occurs at each calculated frequency value. A weighted scoring system is used to assign points to candidate peaks when a flux spectrum peak is found at the calculated frequency value. When all candidate peaks have been scored, the candidate peak with the highest score is selected as the primary running speed peak.

As described above, each frequency value is calculated by first assuming that the frequency at which the candidate vibration peak occurs is the frequency at which the primary running speed peak occurs (i.e., the candidate peak is assumed to be the primary running speed peak). The assumed primary running speed frequency ($RS_A$) is then substituted into the following equations to determine each calculated frequency value ($F_C$).

$$F_C = RS_{B1} = LF = RS_A \tag{6}$$

$$F_C = RS_{B2} = LF + RS_A \tag{7}$$

$$F_C = RS_A \tag{8}$$

$$F_C = RS_{B1} \pm \left(\frac{NP}{2} \times SLIP\right) \tag{9}$$

$$F_C = RS_{B2} \pm \left(\frac{NP}{2} \times SLIP\right) \tag{10}$$

$$F_C = LF - (NP \times SLIP) \tag{11}$$

$$F_C = LF + (NP \times SLIP) \tag{12}$$

where:
$RS_{B\#}$ represents running speed sidebands;
LF represents the line frequency of electrical excitation supplied to the motor;
NP represents the number of poles of the motor; and
SLIP represents motor slip.

Equations 5–11 yield calculated frequencies at which flux spectrum peaks corresponding to running speed are expected to occur. A candidate peak scores points when a peak is found in the flux spectrum at the calculated frequency, and preferably the number of points scored will vary depending on the level of confidence, or weight assigned to each of Equations 5–11. In a preferred embodiment, points are scored by candidate peaks in accordance with the weighted scoring system given below in Table 1.

TABLE 1

| Weighted Scoring for Candidate Peaks | | |
| --- | --- | --- |
| Equation No. | Formula | Score |
| 5 | LF − $RS_A$ | +20 |
| 6 | LF + $RS_A$ | +10 |
| 7 | $RS_A$ | +20 |
| 8 | $RS_{B1}$ ± (NP/2 × SLIP) | +4 |
| 9 | $RS_{B2}$ ± (NP/2 × SLIP) | +4 |
| 10 | LF − (NP × SLIP) | +4 |
| 11 | LF + (NP × SLIP) | +4 |

The cumulative score for each candidate peak is determined and the scores are compared to a predetermined threshold, which is preferably "8". If one or more cumulative scores are greater than "8" (138), the candidate peak having the maximum cumulative score is selected as the primary running speed peak (140). If all scores are less than "8", the candidate peak having the maximum amplitude is selected as the primary running speed peak (142). If two or more candidate peaks have the same maximum cumulative score (in step 140) or maximum amplitude (in step 142), then either candidate peak may be selected as the primary running speed peak.

In an alternate embodiment of the invention shown in FIG. 4, the computer 50 and external vibration and flux sensors 30, 40 shown in FIG. 1 are combined into a single motor monitor 200. The monitor 200, which is preferably fully self-contained in sensors, data acquisition, and power, is small in comparison to the size of the motor 20 and mounted so as not to interfere with the operation of the motor 20. Although FIG. 4 illustrates a monitor 200 mounted at a particular location on the motor frame 204, it will be understood that the monitor 200 may be mounted at any location along the motor frame 204 or otherwise mounted in some manner where vibration and flux may be sensed.

Although the monitor 200 may be attached to the motor 20 by any suitable attachment means, including bolts, screws, rivets, quick release fasteners, welding, adhesives, and magnets, a preferred means of attaching the monitor 200 to the motor 20 is shown in FIG. 4. A mounting plate 202 is secured to the motor frame 204 by bolts or other fastener. The mounting plate 202 includes a threaded recess into which a threaded stud is permanently positioned. The stud is of sufficient length to protrude above the plate 202 so that the monitor 200 can be threaded onto the stud and thereby attached to the motor 20.

A functional block diagram of the motor monitor 200 is shown in FIG. 5. Sensors disposed in the monitor 200 include a vibration transducer 210 and a flux sensor 212. In a preferred embodiment of the monitor 200, a temperature sensor 214 is included for monitoring motor frame temperature. An ambient temperature sensor 224 is also employed in a preferred embodiment. Outputs from all sensors are processed and stored by electronics disposed in the monitor 200. The electronics include signal conditioning circuitry 60, similar to that shown in FIG. 2, for amplifying and frequency filtering the flux and vibration signals. A microcomputer 220 is programmed to control the processing of sensor data and to determine the running speed of the motor 20 based on vibration and flux signals. The microcontroller 220 determines running speed in the same manner as described with regard to the microcontroller shown in FIG. 2 and the method shown in FIGS. 3A–C. A memory 80 is also provided for storing data. In an alternate embodiment, some functions provided by the signal conditioning circuitry 60 are performed by the microcomputer 220. An electrical power source 222 provides all electrical power for the monitor 200. It will be understood that, for purposes of simplifying the block diagram illustration of FIG. 5, all connections to the power source 222 are omitted. A communications port 226, preferably but not limited to an IR data link or an RF data link, is included to enable the monitor 200 to communicate with a peripheral device.

It is contemplated, and will be apparent to those skilled in the art from the foregoing specification, drawings, and examples that modifications and/or changes may be made in the embodiments of the invention. For example, the use of vibration spectrum peaks and flux spectrum in the analysis may be reversed such that candidate peaks may be identified from flux spectrum peaks and a candidate flux peak selected as the primary running speed peak. In this embodiment, vibration spectrum peaks are compared, if necessary, to the candidate flux peaks to determine the primary running speed peak. Accordingly, it is expressly intended that the foregoing are only illustrative of preferred embodiments and modes of operation, not limiting thereto, and that the true spirit and scope of the present invention be determined by reference to the appended claims.

What is claimed is:

1. A programmable apparatus for determining the running speed of an ac induction motor, the apparatus comprising:

a vibration transducer for sensing vibration generated by the motor and producing vibration signals corresponding to the sensed vibration;

a flux sensor for sensing flux generated by the motor and producing flux signals corresponding to the sensed flux;

signal conditioning circuitry for processing the vibration and flux signals to produce processed vibration and flux signals; and a signal processor operable to receive the processed vibration and flux signals and to determine the running speed of the motor by:

performing a first analysis on at least one of the processed vibration and flux signals according to a first predetermined criterion to determine one or more candidate speeds and whether speed will be determined based on the first analysis or whether a second analysis is required; and selectively performing a second analysis if required by the first analysis, said second analysis including the steps of comparing the processed vibration signals to the processed flux signals and determining running speed based on said comparison.

2. The apparatus of claim 1 wherein said signal processor is further operable to perform a first analysis by:

operating on the processed vibration signals to produce a vibration spectrum including a plurality of vibration amplitude peaks at a plurality of vibration frequencies, said vibration spectrum having a resolution;

analyzing the vibration amplitude peaks to identify one or more candidate vibration amplitude peaks according to a predetermined peak criterion, said one or more candidate peaks being identified as peaks possibly corresponding to the running speed of the motor; and selecting a candidate peak from said one or more candidate peaks to use in determining the running speed of the motor.

3. The apparatus of claim 2 wherein said signal processor is further operable to select a candidate peak by determining the number of candidate peaks identified and if only one candidate peak is identified, selecting the one candidate peak to determine running speed, and if more than one candidate peak is identified, performing said second analysis.

4. The apparatus of claim 3 wherein said signal processor is further operable to perform a second analysis by:

operating on the processed flux signals to produce a flux spectrum including a plurality of flux amplitude peaks at a plurality of flux frequencies corresponding to the running speed of the motor;

comparing the candidate vibration peaks to one or more flux peak frequencies and producing a comparison output; and determining the running speed of the motor based on the comparison output.

5. The apparatus of claim 4 wherein said signal processor is further operable to produce the comparison output by scoring each candidate vibration peak based on the frequencies at which one or more flux peaks occur in the flux spectrum.

6. The apparatus of claim 2 wherein said signal processor is further operable to perform a first analysis by:
- calculating a value ($\epsilon$) for each candidate peak, said $\epsilon$ value corresponding to the frequency at which a true peak occurs;
- comparing $\epsilon$ for each candidate peak to a predetermined $\epsilon$ criterion;
- if only one candidate peak is identified and meets the predetermined $\epsilon$ criterion, using the frequency of the candidate peak to determine the running speed of the motor; and
- if more than one candidate peak is identified and each meets the predetermined $\epsilon$ criterion, performing said second analysis.

7. The apparatus of claim 6 wherein said signal processor is further operable to perform a first analysis by:
- if one or more candidate peaks do not meet the predetermined $\epsilon$ criterion and if the motor is a two-pole motor, using the frequency of the candidate peak having the maximum vibration amplitude to determine the running speed of the motor; and
- if the number of candidate peaks identified is greater than one and if the motor is a two-pole motor, using the frequency of the candidate peak having the maximum vibration amplitude to determine the running speed of the motor.

8. The apparatus of claim 1 wherein said signal processor is further operable to perform a first analysis by:
- transforming processed vibration signals to the frequency domain to produce a vibration spectrum containing a first quantity of spectral lines with corresponding amplitude peaks including a primary running speed peak corresponding to the running speed of the motor, said first quantity of spectral lines defining the resolution of the vibration spectrum;
- determining a range of frequencies within the vibration spectrum which contains vibration peaks;
- identifying candidate peaks within the range of frequencies as peaks possibly corresponding to the primary running speed of the motor according to a predetermined peak criterion;
- calculating a value ($\epsilon$) for each candidate peak, said $\epsilon$ value corresponding to the frequency at which a true peak occurs;
- if the number of candidate peaks is equal to one, comparing $\epsilon$ for the candidate peak to a predetermined $\epsilon$ criterion;
- if the candidate peak meets the predetermined $\epsilon$ criterion, selecting the candidate peak as the primary running speed peak;
- if the candidate peak does not meet the predetermined $\epsilon$ criterion, determining whether resolution of the vibration spectrum is at a maximum;
- if resolution of the vibration spectrum is at a maximum, selecting the candidate peak as the primary running speed peak;
- if resolution of the vibration spectrum is not at a maximum, increasing resolution of the vibration spectrum by producing a vibration spectrum containing a second quantity of spectral lines greater than said first quantity and repeating the above steps;
- if the number of candidate peaks identified within the range of frequencies is greater than one, comparing $\epsilon$ for each candidate peak to a predetermined $\epsilon$ criterion;
- if all candidate peaks meet the predetermined $\epsilon$ criterion, performing a second analysis by:
  - transforming flux signals to the frequency domain to produce a flux spectrum;
  - assigning a score to each candidate peak in the vibration spectrum based on the location of peaks in the flux spectrum;
  - if any score is greater than a predetermined score threshold, selecting the candidate vibration peak with the maximum score as the primary running speed peak; and
  - if all scores are less than the predetermined score threshold, selecting the candidate vibration peak with the maximum amplitude as the primary running speed peak;
- if not all candidate peaks meet the predetermined $\epsilon$ criterion, determining whether resolution of the vibration spectrum is at a maximum;
- if resolution of the vibration spectrum is not at a maximum, increasing resolution of the vibration spectrum by producing a vibration spectrum containing a second quantity of spectral lines greater than said first quantity and repeating the above steps;
- if resolution of the vibration spectrum is at a maximum, performing a second analysis by:
  - transforming flux signals to the frequency domain to produce a flux spectrum;
  - assigning a score to each candidate peak in the vibration spectrum based on the location of peaks in the flux spectrum;
  - if any score is greater than a predetermined score threshold, selecting the candidate vibration peak with the maximum score as the primary running speed peak; and
  - if all scores are less than the predetermined score threshold, selecting the candidate vibration peak with the maximum amplitude as the primary running speed peak.

9. A method for determining the running speed of an ac induction motor comprising the steps of:
- sensing vibration generated by the motor and producing vibration signals corresponding to the sensed vibration;
- sensing flux generated by the motor and producing flux signals corresponding to the sensed flux;
- conditioning the vibration and flux signals to produce processed vibration and flux signals;
- performing a first analysis on at least one of the processed vibration and flux signals according to a first criterion to determine one or more candidate speeds and whether speed will be determined based on the first analysis or whether a second analysis is required; and
- selectively performing a second analysis if required by the first analysis, said second analysis including the steps of comparing the vibration signals to the flux signals and determining running speed based on said comparison.

10. The method of claim 9 wherein said first analysis is performed by:
- operating on the processed vibration signals to produce a vibration spectrum including a plurality of vibration amplitude peaks at a plurality of vibration frequencies, said vibration spectrum having a resolution;
- analyzing the vibration amplitudes to identify one or more candidate vibration amplitude peaks according to a predetermined peak criterion, said one or more candidate peaks being identified as peaks possibly corresponding to the running speed of the motor; and selecting a candidate peak from said one or more candidate peaks to use in determining the running speed of the motor.

11. The method of claim 10 wherein said candidate peak is selected by:

determining the number of candidate peaks identified;

if only one candidate peak is identified, selecting the one candidate peak to determine running speed; and if more than one candidate peak is identified, performing said second analysis.

12. The method of claim 11 wherein said second analysis is performed by:

operating on the processed flux signals to produce a flux spectrum including a plurality of flux amplitude peaks at a plurality of flux frequencies corresponding to the running speed of the motor;

comparing the candidate vibration peaks to one or more flux peak frequencies and producing a comparison output; and determining the running speed of the motor based on the comparison output.

13. The method of claim 12 wherein said comparison output is produced by scoring each candidate peak based on the frequencies at which one or more flux peaks occur in the flux spectrum.

14. The method of claim 9 wherein said first analysis is performed by:

calculating a value ($\epsilon$) for each candidate vibration peak, said $\epsilon$ value corresponding to the frequency at which a true peak occurs;

comparing $\epsilon$ for each candidate peak to a predetermined $\epsilon$ criterion;

if only one candidate peak is identified and meets the predetermined $\epsilon$ criterion, using the frequency of the candidate peak to determine the running speed of the motor; and if more than one candidate peak is identified and each meets the predetermined $\epsilon$ criterion, performing said second analysis.

15. The method of claim 9 wherein said first analysis is performed by:

transforming processed vibration signals to the frequency domain to produce a vibration spectrum containing a first quantity of spectral lines with corresponding amplitude peaks including a primary running speed peak corresponding to the speed of the motor, said first quantity of spectral lines defining the resolution of the vibration spectrum;

determining a range of frequencies within the vibration spectrum which contains vibration peaks;

identifying candidate peaks within the range of frequencies as peaks possibly corresponding to the primary running speed of the motor according to a predetermined peak criterion;

calculating a value ($\epsilon$) for each candidate peak, said $\epsilon$ value corresponding to the frequency at which a true peak occurs;

if the number of candidate peaks is equal to one, comparing $\epsilon$ for the candidate peak to a predetermined $\epsilon$ criterion;

if the candidate peak meets the predetermined $\epsilon$ criterion, selecting the candidate peak as the primary running speed peak;

if the candidate peak does not meet the predetermined $\epsilon$ criterion, determining whether resolution of the vibration spectrum is at a maximum;

if resolution of the vibration spectrum is at a maximum, selecting the candidate peak as the primary running speed peak;

if resolution of the vibration spectrum is not at a maximum, increasing resolution of the vibration spectrum by producing a vibration spectrum containing a second quantity of spectral lines greater than said first quantity and repeating the above steps;

if the number of candidate peaks identified within the range of frequencies is greater than one, comparing $\epsilon$ for each candidate peak to a predetermined $\epsilon$ criterion;

if all candidate peaks meet the predetermined $\epsilon$ criterion, performing a second analysis by:

transforming flux signals to the frequency domain to produce a flux spectrum;

assigning a score to each candidate peak in the vibration spectrum based on the location of peaks in the flux spectrum;

if any score is greater than a predetermined score threshold, selecting the candidate vibration peak with the maximum score as the primary running speed peak; and if all scores are less than the predetermined score threshold, selecting the candidate vibration peak with the maximum amplitude as the primary running speed peak;

if not all candidate peaks meet the predetermined $\epsilon$ criterion, determining whether resolution of the vibration spectrum is at a maximum;

if resolution of the vibration spectrum is not at a maximum, increasing resolution of the vibration spectrum by producing a vibration spectrum containing a second quantity of spectral lines greater than said first quantity and repeating the above steps;

if resolution of the vibration spectrum is at a maximum, performing a second analysis by:

transforming flux signals to the frequency domain to produce a flux spectrum;

assigning a score to each candidate peak in the vibration spectrum based on the location of peaks in the flux spectrum;

if any score is greater than a predetermined threshold, selecting the candidate vibration peak with the maximum score as the primary running speed peak; and if all scores are less than the predetermined threshold, selecting the candidate vibration peak with the maximum amplitude as the primary running speed peak.

16. A programmable apparatus for determining the running speed of an ac induction motor, the apparatus comprising:

a structural enclosure;

means for attaching said enclosure to the motor;

a power source disposed in said enclosure for supplying dc electrical power to the apparatus;

a vibration transducer disposed in said enclosure for sensing vibration generated by the motor and producing vibration signals corresponding to the sensed vibration;

a flux sensor disposed in said enclosure for sensing flux generated by the motor and producing flux signals corresponding to the sensed flux; and a signal processor disposed in said enclosure for determining the running speed of the motor based on said vibration and flux signals.

17. The apparatus of claim 16 wherein said signal processor is operable to determine running speed by:
    transforming vibration signals to the frequency domain to produce a vibration spectrum having a plurality of vibration amplitude peaks at a plurality of frequencies, said vibration spectrum having a resolution;
    transforming flux signals to the frequency domain to produce a flux spectrum having a plurality of flux amplitude peaks at a plurality of frequencies;
    performing a first analysis on at least one of the vibration and flux spectra according to a first criterion to determine candidate amplitude peaks and whether speed will be determined based on the first analysis or whether a second analysis is required; and
    selectively performing a second analysis if required by the first analysis, said second analysis including the steps of comparing the frequency of one or more peaks in the vibration spectrum to one or more frequencies in the flux spectrum and determining running speed based on said comparison.

18. The apparatus of claim 17 wherein said signal processor is further operable to perform a first analysis by:
    analyzing the vibration amplitudes to identify one or more candidate vibration amplitude peaks according to a predetermined peak criterion, said one or more candidate peaks being identified as peaks possibly corresponding to the running speed of the motor; and
    selecting a candidate peak from said one or more candidate peaks to use in determining the running speed of the motor.

19. The apparatus of claim 18 wherein said signal processor is further operable to select a candidate peak by determining the number of candidate peaks identified and if only one candidate peak is identified, selecting the one candidate peak to determine running speed, and if more than one candidate peak is identified, performing said second analysis.

20. The apparatus of claim 19 wherein said signal processor is further operable to perform a second analysis by:
    operating on the flux signals to produce a flux spectrum including a plurality of flux amplitude peaks at a plurality of flux frequencies corresponding to the running speed of the motor;
    comparing the candidate peaks one or more flux peak frequencies and producing a comparison output; and
    determining the running speed of the motor based on the comparison output.

21. The apparatus of claim 20 wherein said signal processor is further operable to produce the comparison output by scoring each candidate peak based on the frequencies at which one or more flux amplitude peaks occur in the flux spectrum.

22. The apparatus of claim 17 wherein said signal processor is further operable to perform a first analysis by:
    calculating a value ($\epsilon$) for each candidate peak, said $\epsilon$ value corresponding to the frequency at which a true peak occurs;
    comparing $\epsilon$ for each candidate peak to a predetermined $\epsilon$ criterion;
    if only one candidate peak is identified and meets the predetermined $\epsilon$ criterion, using the frequency of the candidate peak to determine the running speed of the motor; and
    if more than one candidate peak is identified and each meets the predetermined $\epsilon$ criterion, performing said second analysis.

23. The apparatus of claim 22 wherein said signal processor is further operable to perform a first analysis by:
    if one or more candidate peaks do not meet the predetermined $\epsilon$ criterion and if the motor is a two-pole motor, using the frequency of the candidate peak having the maximum vibration amplitude to determine the running speed of the motor; and
    if the number of candidate peaks identified is greater than one and if the motor is a two-pole motor, using the frequency of the candidate peak having the maximum vibration amplitude to determine the running speed of the motor.

24. The apparatus of claim 17 wherein said signal processor is further operable to perform a first analysis by:
    transforming vibration signals to the frequency domain to produce a vibration spectrum containing a first quantity of spectral lines with corresponding amplitude peaks including a primary running speed peak corresponding to the speed of the motor, said first quantity of spectral lines defining the resolution of the vibration spectrum;
    determining a range of frequencies within the vibration spectrum which contains vibration peaks;
    identifying candidate peaks within the range of frequencies as peaks possibly corresponding to the primary running speed of the motor according to a predetermined peak criterion;
    calculating a value ($\epsilon$) for each candidate peak, said $\epsilon$ value corresponding to the frequency at which a true peak occurs;
    if the number of candidate peaks is equal to one, comparing $\epsilon$ for the candidate peak to a predetermined $\epsilon$ criterion;
    if the candidate peak meets the predetermined $\epsilon$ criterion, selecting the candidate peak as the primary running speed peak;
    if the candidate peak does not meet the predetermined $\epsilon$ criterion, determining whether resolution of the vibration spectrum is at a maximum;
    if resolution of the vibration spectrum is at a maximum, selecting the candidate peak as the primary running speed peak;
    if resolution of the vibration spectrum is not at a maximum, increasing resolution of the vibration spectrum by producing a vibration spectrum containing a second quantity of spectral lines greater than said first quantity and repeating the above steps;
    if the number of candidate peaks identified within the range of frequencies is greater than one, comparing $\epsilon$ for each candidate peak to a predetermined $\epsilon$ criterion;
    if all candidate peaks meet the predetermined $\epsilon$ criterion, performing a second analysis by:
        transforming flux signals to the frequency domain to produce a flux spectrum;
        assigning a score to each candidate peak in the vibration spectrum based on the location of peaks in the flux spectrum;
        if any score is greater than a predetermined score threshold, selecting the candidate vibration peak with the maximum score as the primary running speed peak; and
        if all scores are less than the predetermined score threshold, selecting the candidate vibration peak with the maximum amplitude as the primary running speed peak;
    if not all candidate peaks meet the predetermined $\epsilon$ criterion, determining whether resolution of the vibration spectrum is at a maximum;

if resolution of the vibration spectrum is not at a maximum, increasing resolution of the vibration spectrum by producing a vibration spectrum containing a second quantity of spectral lines greater than said first quantity and repeating the above steps;

if resolution of the vibration spectrum is at a maximum, performing a second analysis by:

transforming flux signals to the frequency domain to produce a flux spectrum;

assigning a score to each candidate peak in the vibration spectrum based on the location of peaks in the flux spectrum;

if any score is greater than a predetermined threshold, selecting the candidate vibration peak with the maximum score as the primary running speed peak; and if all scores are less than the predetermined threshold, selecting the candidate vibration peak with the maximum amplitude as the primary running speed peak.

25. A method for determining the running speed of an ac induction motor comprising the steps of:

attaching an electric motor monitor to the outer frame of an ac induction motor;

producing vibration signals with said monitor representing vibrations generated by the motor;

producing flux signals with said monitor representing magnetic flux generated by the motor; and processing the vibration and flux signals with said motor monitor to determine the running speed of the motor.

26. The method of claim 25 wherein said processing step includes the steps of:

performing a first analysis on at least one of the vibration and flux signals according to a first criterion to determine candidate speeds and whether speed will be determined based on the first analysis or whether a second analysis is required; and selectively performing a second analysis if required by the first analysis, said second analysis including the steps of comparing the vibration signals to the flux signals and determining running speed based on said comparison.

27. A programmable apparatus for determining the running speed of an induction motor, the apparatus comprising:

a vibration transducer for sensing vibration generated by the motor and producing vibration signals corresponding to the sensed vibration;

a flux sensor for sensing flux generated by the motor and producing flux signals corresponding to the sensed flux;

signal conditioning circuitry for processing the vibration and flux signals to produce processed vibration and flux signals; and a signal processor operable to receive the processed vibration and flux signals and to determine the running speed of the motor by:

operating on the vibration signals to produce a vibration spectrum including a plurality of vibration amplitude peaks at a plurality of vibration frequencies, said vibration spectrum having a resolution;

analyzing the vibration amplitudes to identify candidate vibration amplitude peaks according to a predetermined peak criterion, said candidate peaks being identified as peaks possibly corresponding to the running speed of the motor;

if only one candidate peak is identified, using the frequency of the candidate peak to determine the running speed of the motor; and if two or more candidate peaks are identified, using the frequency of the candidate peak having the maximum vibration amplitude to determine the running speed of the motor if the motor is a two-pole motor, and if the motor has more than two poles;

operating on the flux signals to produce a flux spectrum including a plurality of flux amplitude peaks at a plurality of flux frequencies corresponding to the running speed of the motor;

comparing the candidate vibration peaks to the amplitudes of one or more flux peak frequencies and producing a comparison output; and determining the running speed of the motor based on the comparison output.

* * * * *